United States Patent [19]

Okano et al.

[11] Patent Number: 5,903,423
[45] Date of Patent: May 11, 1999

[54] BATTERY PACK FOR ELECTRIC POWER TOOLS

[75] Inventors: Shizuo Okano, Mihara-gun; Takao Takatsu, Sumoto; Kazuo Osaki, Mihara-gun; Takamasa Yamazoe, Sumoto, all of Japan

[73] Assignee: Sanyo Electric Co., Ltd., Osaka, Japan

[21] Appl. No.: 08/929,653

[22] Filed: Sep. 16, 1997

[30] Foreign Application Priority Data

Sep. 30, 1996 [JP] Japan ..................................... 8-258638

[51] Int. Cl.⁶ ....................................................... H02H 5/04
[52] U.S. Cl. ............................ 361/103; 361/87; 320/107; 320/112
[58] Field of Search .................................. 361/58, 93, 87, 361/103; 429/65, 90–92; 320/112, 134, 136, 150, 151–154, FOR 127, FOR 128, FOR 129, FOR 139, DIG. 13, 107

[56] References Cited

U.S. PATENT DOCUMENTS 4,829,226  5/1989  Nakamura et al. ........................ 320/35

FOREIGN PATENT DOCUMENTS 2-32723  2/1990  Japan .
5-15293  2/1993  Japan .
6-21134  3/1994  Japan .

Primary Examiner—Ronald W. Leja
Attorney, Agent, or Firm—Wenderoth, Lind & Ponack, L.L.P.

[57] ABSTRACT

The battery pack for electric power tools of this invention has a circuit breaker connected in series with the batteries to protect those batteries from abnormal temperature or abnormal current by cutting-off the current. The circuit breaker is provided with a manual reset mechanism wherein even if the temperature sensing element is cooled, automatic reset will not occur. The circuit breaker must be manually reset. After the circuit breaker detects battery abnormality and cuts-off current, the current cut-off state is maintained until the manual reset mechanism is operated.

19 Claims, 9 Drawing Sheets

BATTERY PACK FOR ELECTRIC POWER TOOLS

BACKGROUND OF THE INVENTION

This invention relates to a battery pack used as the power source for electric power tools.

A battery pack used for an electric power tool is often used under extremely harsh environmental conditions. For example, when used with a highly loaded motor, instantaneous load currents become exceedingly large and batteries discharge large currents over short time intervals. In addition, the battery pack may be used in an environment with significantly high ambient temperature. Finally, re-use of the battery pack can be required as soon as possible after battery discharge. Therefore, batteries may be rapidly charged at high currents and used in a high temperature state.

A battery pack housing a circuit breaker has been developed to protect batteries from this type of environment. The circuit breaker is connected in series with the batteries and cuts-off current when battery temperature becomes abnormally high or when battery current becomes abnormally large. For this reason, the circuit breaker contains a system to detect battery temperature and cut-off current, and a system to detect current flow in the batteries and cut-off current.

A battery pack housing a circuit breaker cuts-off current and protects the batteries, for example, when the motor of an electric power tool locks-up and extremely large current near that of a short circuit flows. Further, current is cut-off to protect the batteries when continuous high current results in an abnormal rise in battery temperature.

A battery pack which houses a circuit breaker has the feature that batteries can be protected to extend their lifetime. However, since the circuit breaker cuts-off current using a device such as a thermostat to sense temperature, when the temperature drops, the circuit breaker automatically resets. When the circuit breaker resets, current again flows and a motor of the electric power tool may begin turning possibly leading to a dangerous situation. Particularly in an electric power tool with a power switch which can be maintained in the on position, if a motor locks-up and the circuit breaker cuts-off current, motor rotation will stop without turning the power switch off. In this case, one may forget to turn the power switch off. A dangerous situation can develop if a circuit breaker resets to turn over a motor in an electric power tool with its power switch in the on position. Of particular danger is sudden rotation of an electric power tool motor which has cutting blades attached.

The present invention was developed to solve this problem. Thus it is a primary object of this invention to provide a battery pack for electric power tools which not only protects batteries with a circuit breaker, but is also extremely safe to use.

The above and further objects and features of the invention will more fully be apparent from the following detailed description with accompanying drawings.

SUMMARY OF THE INVENTION

The battery pack for electric power tools of the present invention has a circuit breaker connected in series with the batteries which cuts-off current to protect the batteries in case of abnormal temperature or abnormal current. The circuit breaker is provided with a manual reset mechanism requiring manual operation to reset from the current cut-off state. The circuit breaker will not reset automatically even if a temperature sensing element is cooled. After the circuit breaker detects a battery abnormality and cuts-off current, the cut-off state is maintained until the manual reset mechanism is operated.

A battery pack with this configuration can not only effectively protect batteries to extend battery life, but it also has the feature that electric power tools can be used with extreme safety. In particular, after the circuit breaker has cut-off current, forcing motors and other parts to cease rotating, unsafe situations resulting from unexpected electric power tool motor rotation are effectively prevented. This is because the circuit breaker, which cuts-off current under abnormal conditions in the battery pack for electric power tools of the present invention, is provided with a manual reset mechanism requiring manual operation to reset from the cut-off state. The circuit breaker, which detects battery abnormality and cuts-off current, is maintained in the cut-off state until the manual reset mechanism is operated. This type of battery pack has the feature that it can be used safely, for example, when attached to an electric power tool which utilizes blades, such as a power drill. This is because after a power drill motor lock-up, the circuit breaker will not automatically reset.

Further, the battery pack for electric power tools of the present invention is preferably embodied with a unique structure to avoid mistaken operation of the manual reset mechanism. Namely, the circuit breaker manual reset mechanism is provided with a reset button which must be pushed to reset the circuit breaker. The reset button is disposed within a recessed region provided in the battery pack case. The system is configured for circuit breaker reset when the reset button within the recessed region is pushed.

Therefore, a battery pack with this configuration has the additional safety feature of reliable reset from the cut-off state while avoiding mistaken operation. Specifically, since the manual reset mechanism is provided with a reset button which is disposed within a recessed region in the case, pushing the reset button by mistake is avoided after circuit breaker activation to cut-off current due to an abnormality.

DETAILED DESCRIPTION OF THE INVENTION

Figure 1:
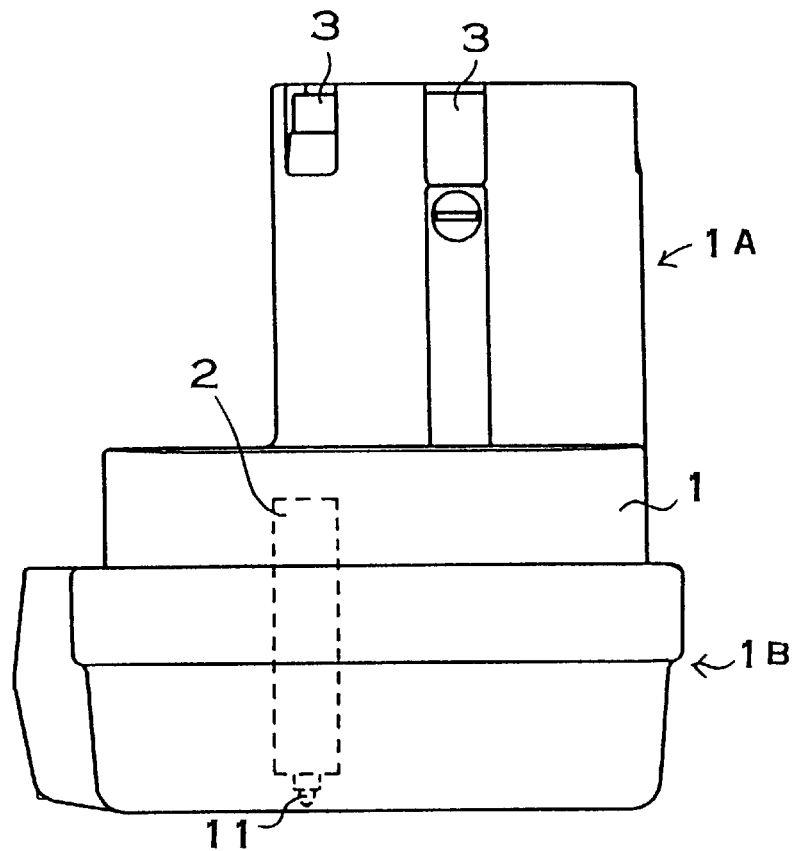
FIG. 1 is a side view showing an embodiment of the battery pack for electric power tools of the present invention.
Figure 2:
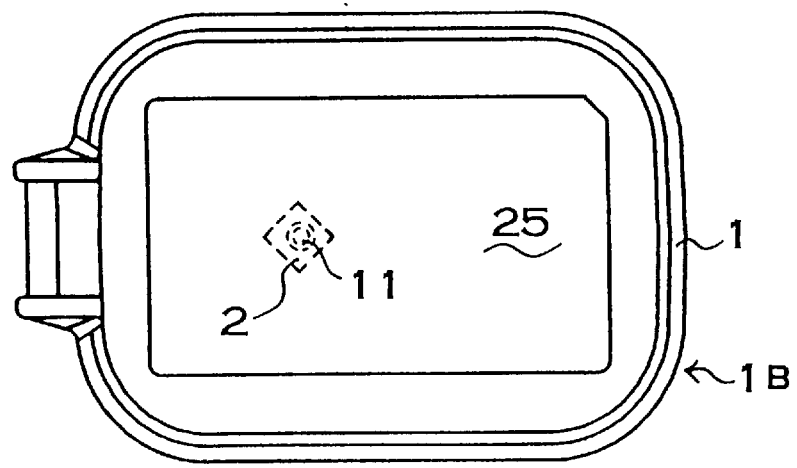
FIG. 2 is a plan view of the battery pack shown in FIG. 1.
Figure 3:
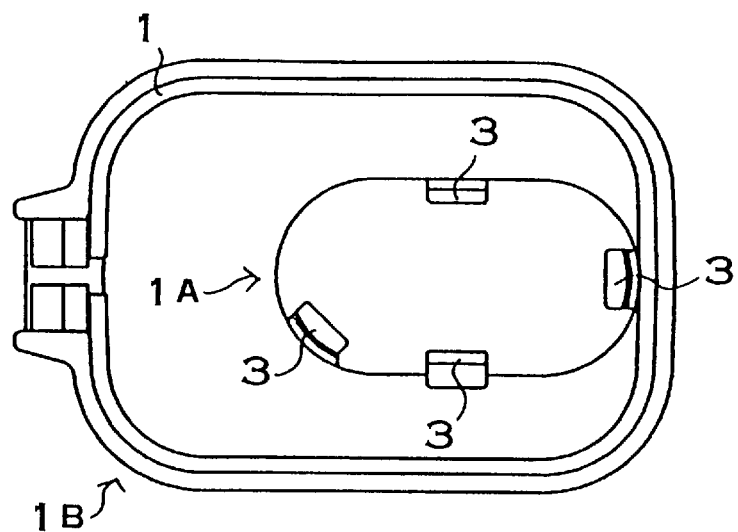
FIG. 3 is a bottom view of the battery pack shown in FIG. 1.

Turning to FIGS. 1 through 3, the battery pack shown has a case 1 containing rechargeable batteries (not illustrated) and a circuit breaker. The case 1 is made up of an insertion section 1A which is inserted into the grip of an electric power tool, and a main section 1B which contains six rechargeable batteries aligned in a parallel fashion. The insertion section 1A holds two rechargeable batteries and is provided with four terminals 3 on its end.

Figure 4:
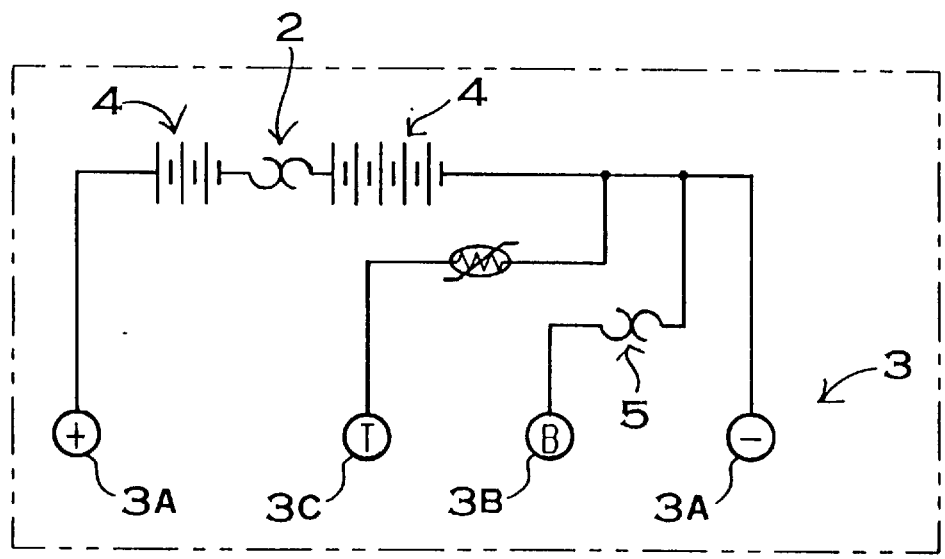
FIG. 4 is a circuit diagram of a battery pack for an embodiment of the present invention.

As shown in the circuit diagram of FIG. 4, the four terminals 3 are positive and negative terminals 3A, charging terminal 3B, and charging temperature terminal 3C. Charging terminal 3B is connected to the batteries 4 through a charging circuit breaker 5. The charging circuit breaker 5 cuts-off current during charging if battery temperature rises abnormally or if charging current becomes too large. The charging temperature terminal 3C transmits a battery temperature signal to the charging circuit.

In addition, the battery pack of these figures has a circuit breaker 2 connected in series with the batteries 4. The circuit breaker 2 protects the batteries 4 by cutting-off current flow when battery temperature rises abnormally or when abnormally large currents flow through the batteries 4. A circuit breaker 2 which senses both temperature and current to cut-off current can protect the batteries 4 with the greatest degree of safety. However, the battery pack of the present invention may also be fitted with a circuit breaker which cuts-off current by sensing only abnormal battery temperature or only abnormal current.

Figure 5:
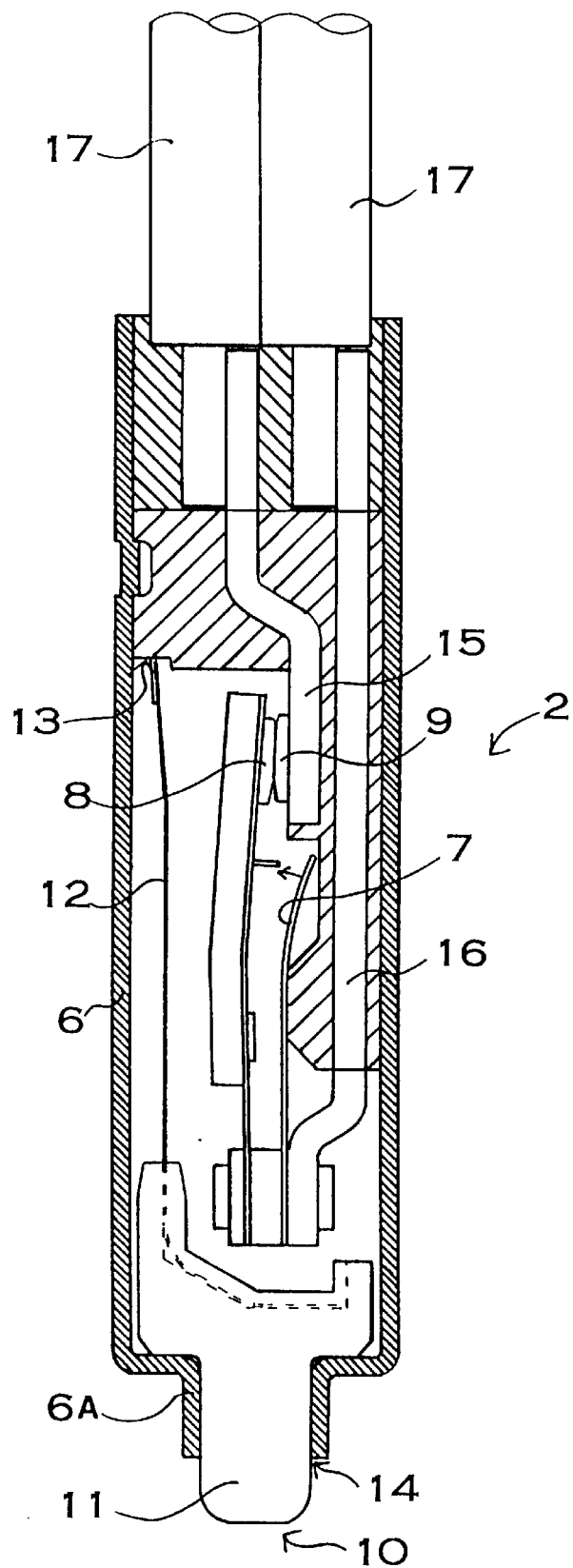
FIG. 5 is a cross-section view of a circuit breaker for an embodiment of the present invention.

Turning to FIG. 5, the internal structure of a circuit breaker 2 which senses both battery temperature and current to cut-off current is shown. In the circuit breaker 2 of FIG. 5, a bimetal temperature sensing element 7, which distorts depending on the temperature sensed, is contained inside a metal case 6. In FIG. 5, the bimetal 7 is disposed to the right side of a movable contact 8. When the bimetal 7 is heated to a temperature above a set temperature, it distorts to push the movable contact 8 to the left separating the movable contact 8 from a stationary contact 9. The lower end of the bimetal 7 is held fixed together with the end of the movable contact 8.

The movable contact 8 is a piece of conductive metal. When the movable contact 8 is touching the stationary contact 9, the circuit breaker 2 is in the on state. When the movable contact 8 is separated from the stationary contact 9, the circuit breaker 2 is in the off state and current is cut-off. The movable contact 8 is a metal plate which can distort elastically and stop at the on or off position. The movable contact 8 does not stop at an intermediate position between the off and on positions. When the movable contact 8 is reset and not pushed by the bimetal 7, it is in the position shown in FIG. 5 forcibly pressed against the stationary contact 9. When the movable contact 8 is pushed against by the bimetal 7, it separates from the stationary contact 9. When the movable contact 8 distorts to this off position, it will stay in this position even if it is not being pushed against by the bimetal 7, and it will not touch the stationary contact 9. The movable contact 8 has a type of flexibility that holds it in stable positions touching the stationary contact 9 and separated from the stationary contact 9. In the circuit breaker 2 shown in FIG. 5, this configuration of movable contact 8, which is a piece of flexible metal, is realized, for example, by establishing a concave section at the center region. However, although not illustrated, the circuit breaker of the present invention may also use springs as already often adopted for various switches and the like. In this case, springs are used in a mechanism that holds the movable contact in a position touching the stationary contact and in a position separated from the stationary contact.

In FIG. 5, a manual reset mechanism 10 to manually reset from the current cut-off state is disposed near the movable contact 8. The manual reset mechanism 10 is provided with a reset button 11 which protrudes from the case 6 and a leaf spring 12 which distorts when the reset button 11 is pushed.

The leaf spring 12 is disposed to the left side and in close proximity to the movable contact 8, and its lower end is connected to the reset button 11. The upper end of the leaf spring 12 extends inside the case 6 to the position of a stopper 13. The leaf spring 12 curves in a bow shape when the reset button 11 is pushed and applies pressure to push the movable contact 8 towards the stationary contact 9. To cause the center region of the leaf spring 12 to protrude to the right when the reset button 11 is pressed, its center is slightly bowed to the right even when the reset button 11 is not pressed.

The reset button 11 protrudes from a hole 14 in the bottom of the case 6 and is disposed in a manner allowing it to move in and out of the case 6. The reset button 11 is pushed out to a set position by the leaf spring 12. The reset button 11 is installed in the case 6 in a manner allowing it to slide along the inside surfaces of the cylinder 6A formed by the hole 14 in the case 6 and along the non-cylindrical walls of the case 6. This allows the reset button 11 to move up and down in FIG. 5 in parallel translational motion.

The circuit breaker 2 shown in FIG. 5 also contains a stationary side plate 15 to which the stationary contact 9 is fixed, and a movable side plate 16 to which the movable contact 8 is connected. These plates are insulated by plastic. The stationary side plate 15 and the movable side plate 16 are connected at the upper end of the case 6 to insulated and anchored lead terminals 17.

The circuit breaker 2 of FIG. 5 has the bimetal 7 disposed between the movable side plate 16 and the movable contact 8. Bimetal 7 disposed in this fashion cuts-off current by both battery temperature and load current. When the temperature of the battery pack containing the circuit breaker 2 becomes high, the bimetal 7 is heated through the case 6. In addition, when large current flows, the stationary side plate 15 and the movable contact 8 generate heat causing the bimetal 7 to distort. The heated bimetal 7 distorts separating the movable contact 8 from the stationary contact 9 and cutting-off current. In the circuit breaker 2 of FIG. 5, load current does not flow directly through the bimetal 7 to heat the bimetal 7. Instead, the stationary side plate 15 and the movable contact 8 near the bimetal 7 are heated by load current, and the bimetal 7 distorts due to this heat to cut-off current. However, the circuit breaker in the battery pack of the present invention is not limited to the structure shown in the figures. For example, a circuit breaker structure is also possible where load current flows directly through the bimetal to heat the bimetal and current is cut-off due to excessive load current.

Figure 6:
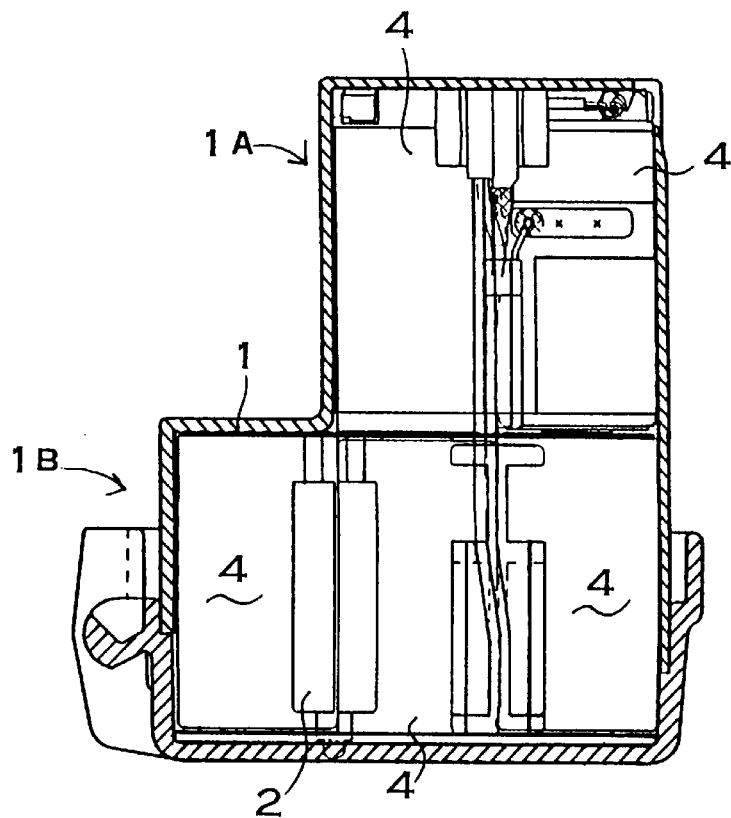
FIG. 6 is a vertical cross-section view of the battery pack shown in FIG. 1.
Figure 7:
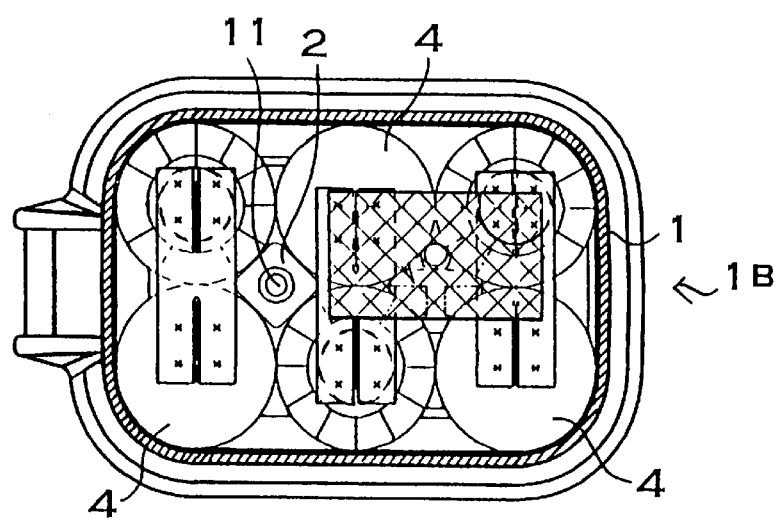
FIG. 7 is a horizontal cross-section view of the battery pack shown in FIG. 1.
Figure 8:
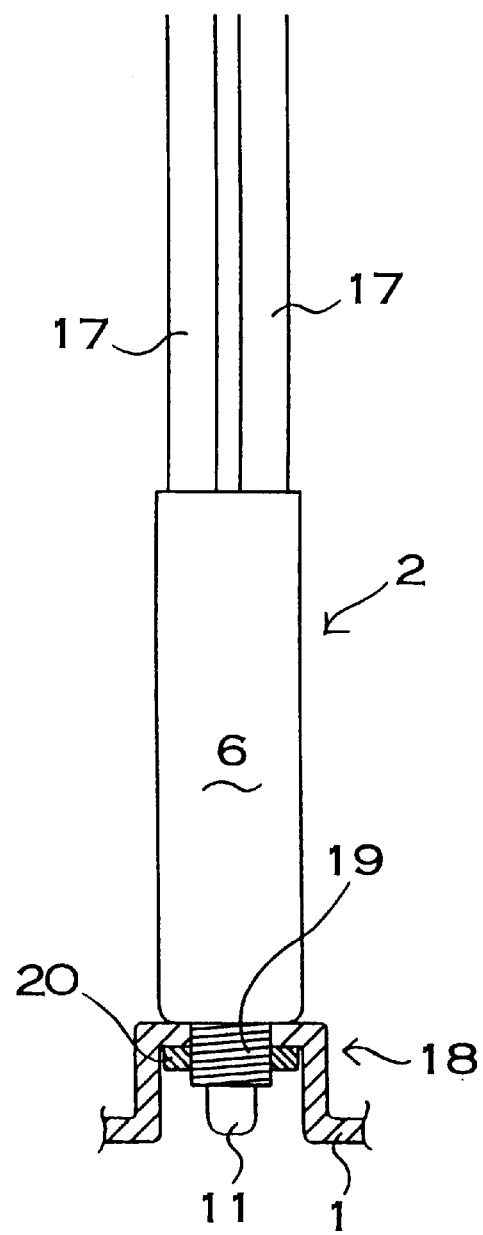
FIG. 8 is a cross-section view showing case attachment of the circuit breaker.

As shown in FIGS. 6 and 7, the circuit breaker is disposed in a gap created between batteries 4. In the battery pack of these figures, the circuit breaker 2 is housed in the main section 1B which contains six rechargeable batteries 4. As shown in the cross-section drawings of FIGS. 6 and 8, the reset button 11 of the circuit breaker 2 is disposed in a recessed region 18 in the bottom of the battery pack case 1. As shown in these figures, circuit breaker 2, with the reset button 11 disposed in a recessed region 18, is protected from mistaken reset button 11 pushing. The threaded section 19 of the bottom end of the circuit breaker 2 of these figures passes through the base of the recessed section 18 of the case 1 and the nut 20 sandwiches the base of the recessed section to anchor the circuit breaker.

Figure 9:
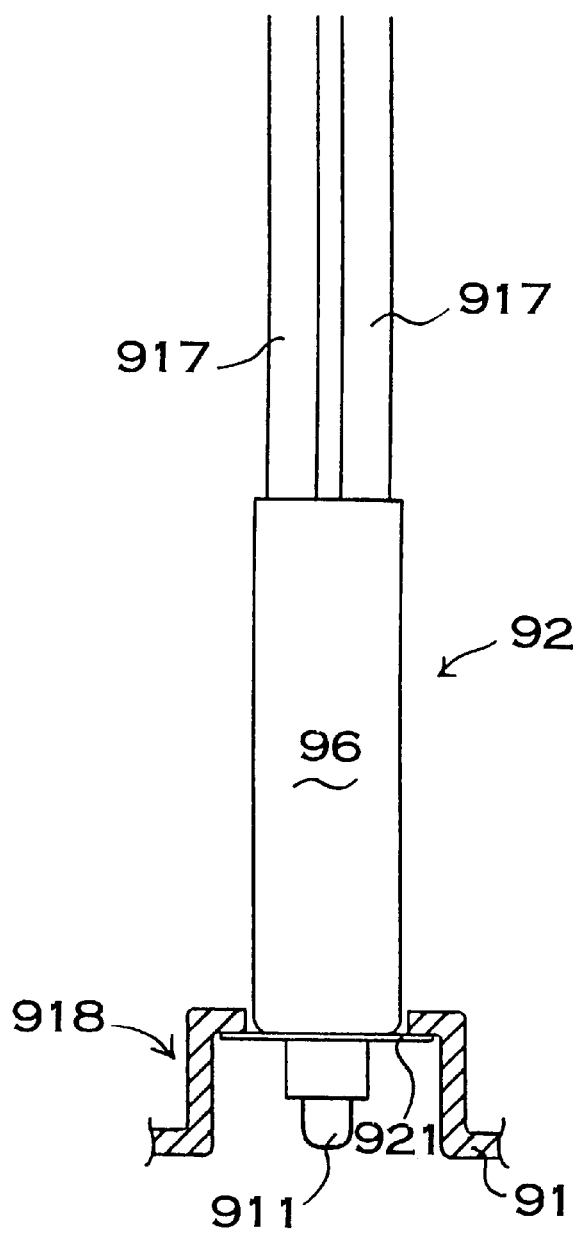
FIG. 9 is a cross-section view showing another embodiment of case attachment of the circuit breaker.
Figure 10:
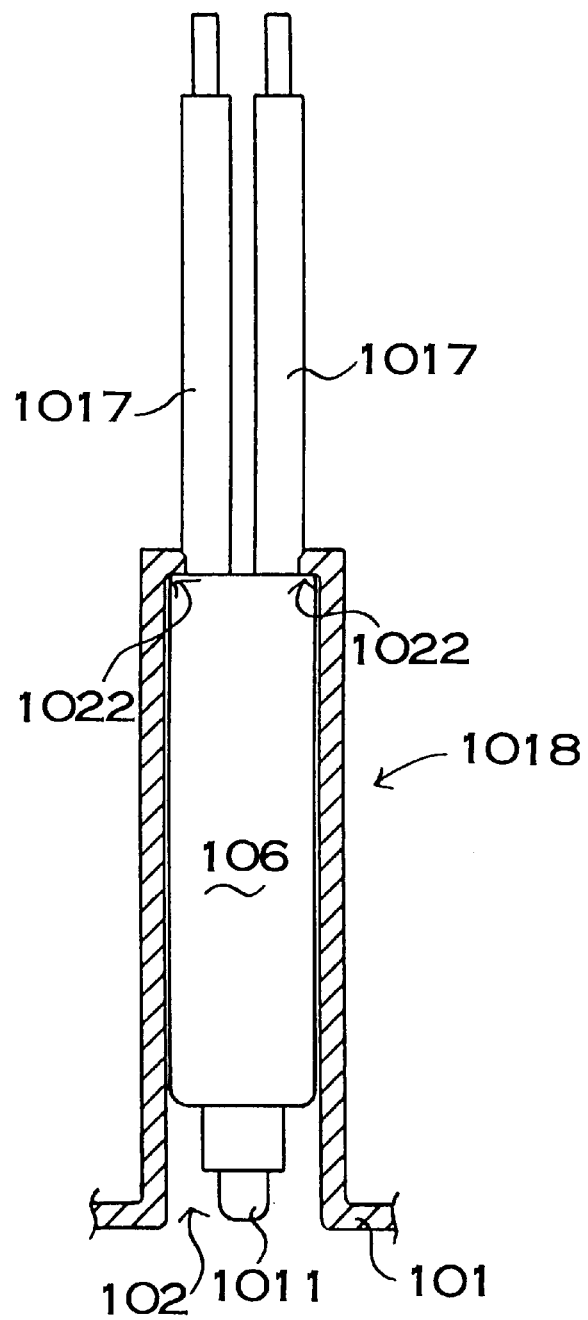
FIG. 10 is a cross-section view showing yet another embodiment of case attachment of the circuit breaker.

Turning to FIG. 9, a different structure for attaching the circuit breaker to the case is shown. In the battery pack of FIG. 9, the case 96 of the circuit breaker 92 has an attachment plate 921 fixed to its end. The attachment plate 921 is fixed to the base of the recessed region 918 of the battery pack case 91 by bonding or welding to dispose the reset button 911 within the recessed region 918 of the case 91. In FIG. 9, part number 917 designates the lead terminals. Turning next to FIG. 10, a recessed region 1018 is formed in the case 101 in which the entire circuit breaker 102 can be inserted. The circuit breaker 102 is inserted in, and attaches in this recessed region 1018 to dispose the reset button 1011 within the recessed region 1018 of the case 101. To facilitate attachment of the circuit breaker 102, clasps 1022 protrude out at the base of the recessed region 1018. The clasps 1022 pinch inward between the circuit breaker 102 case 106 and the lead terminals 1017 to anchor the circuit breaker 102 within the recessed region 1018 of the case 101 in a manner that does not allow it to pull out.

Figure 11:
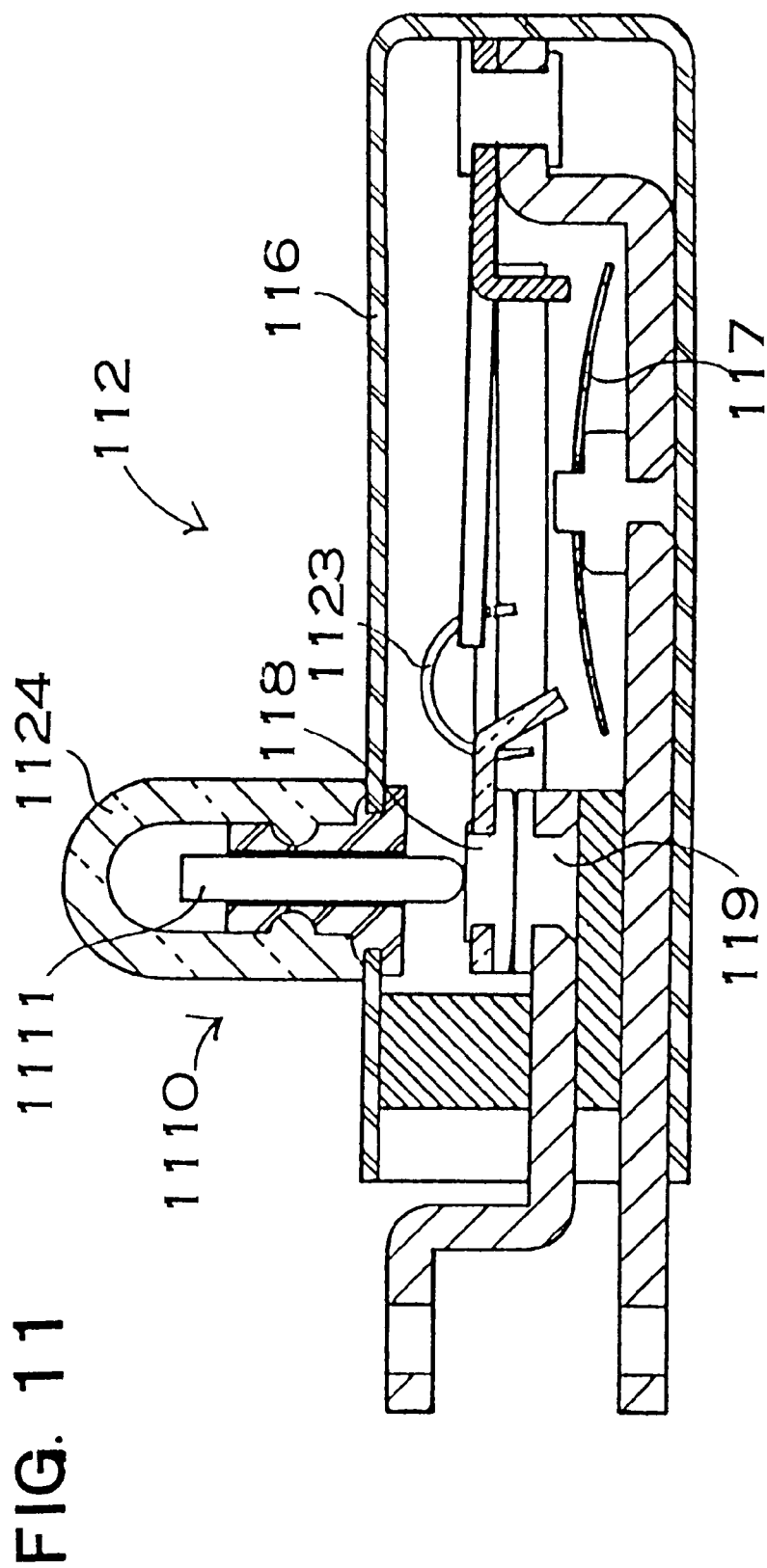
FIG. 11 is a cross-section view of a circuit breaker for another embodiment of the present invention.

The present invention is not restricted to the previously described circuit breaker structure and point of attachment. Turning to FIG. 11, a circuit breaker having a different structure is shown. The circuit breaker 112 of FIG. 11 has a movable contact 118 provided with a toggle spring 1123. The reset button 1111 of the manual reset mechanism 1110 applies pressure directly to the movable contact 18 for reset. The movable contact 118 with its toggle spring 1123 is pushed by the bimetal 117 disposed to its right side in the drawing. When the bimetal 117 pushes the movable contact 118, the movable contact 118 separates from the stationary contact 119. The toggle spring 1123 resiliently presses the movable contact 118 against the stationary contact 119 when the bimetal 117 does not apply pressure to the movable contact 118, and the toggle spring 1123 maintains the movable contact 118 in a separated position when the movable contact 118 is pushed away from the stationary contact 119 by the bimetal 117.

The reset button 1111 is disposed opposite the bottom end of the movable contact 118 to press the movable contact 118 towards the stationary contact 119 and reset from the current cut-off state. The reset button 1111 is connected to the case 116 with a rubber cover 1124 in a manner that allows it to move in a direction that pushes the movable contact 118 towards the stationary contact 119. The rubber cover 1124 is made as a resilient piece of rubber having flexibility to deform with hand pressure, and it attaches the reset button 1111 to the case 116 in a water-tight fashion.

Figure 12:
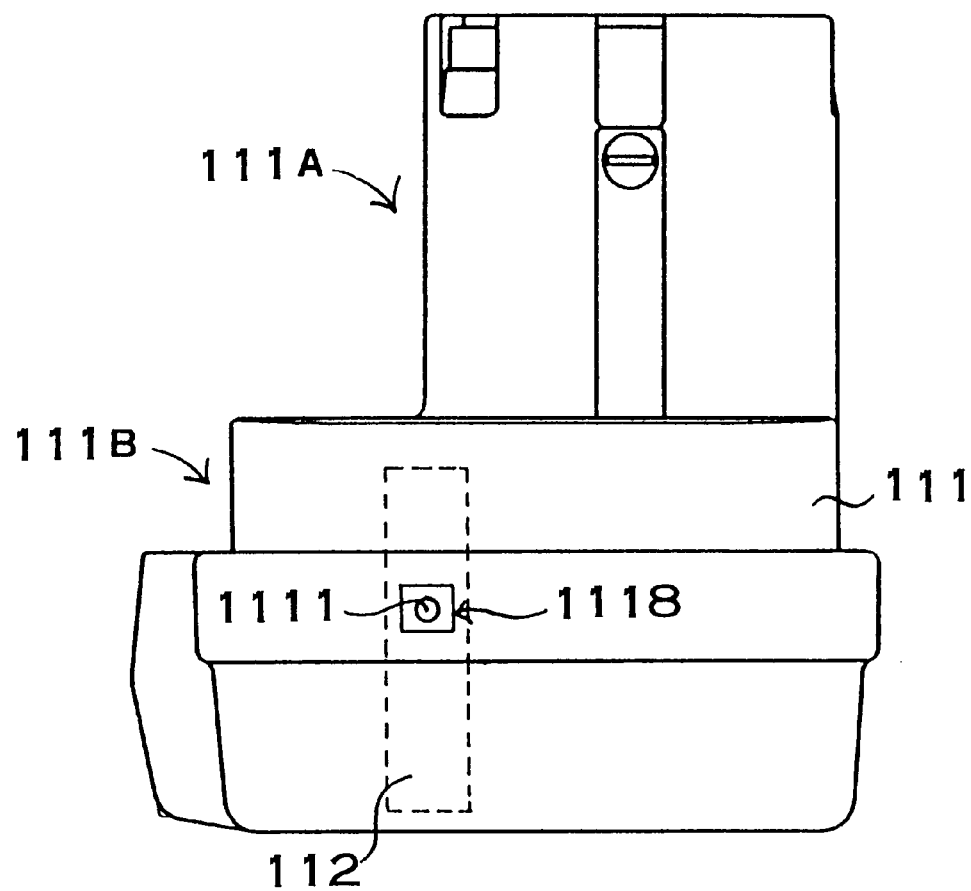
FIG. 12 is a side view of a battery pack housing the circuit breaker shown in FIG. 11.

This type of circuit breaker 112 is disposed, for example, as shown in FIG. 12, on a side wall of the main section 111B. The circuit breaker 112 with this arrangement has its reset button 1111 disposed in a recessed region 1118 provided in the case 111 in the same manner as the battery packs shown in FIGS. 8 through 10.

Further, although not illustrated, the circuit breaker reset button may also be located on the insertion section of the case. A battery pack having this circuit breaker location must be disconnected from the electric power tool or the reset button cannot be pressed. Therefore, the battery pack can be used safely because after the circuit breaker cuts-off current, the cut-off state cannot be reset without separating the battery pack from the electric power tool.

The circuit breaker reliably cuts-off current to shut off the battery pack during abnormalities, but it certainly does not go to the off state on a regular basis. As a result, a seal 25 may also be attached on the opening of the recessed region 18 housing the circuit breaker 2 reset button 11, as shown in FIG. 2, to make a moisture preventive configuration. This battery pack configuration not only prevents moisture ingress through the circuit breaker 2 attachment region, but also reliably prevents the reset button 11 from being pushed by mistake. This is because the reset button 11 is hidden by the seal 25. The seal 25 hiding the reset button 11 can be removed by a repair person to press the reset button.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A battery pack for electric power tools, comprising:
   a circuit breaker connected in series with batteries and which cuts-off current due to at least one of abnormal temperature and abnormal current, said circuit breaker having a manual reset mechanism for manual reset from the current cut-off state;
   wherein the manual reset mechanism is provided with a reset button, and the reset button is disposed in a recessed region of a battery pack case; and
   wherein the circuit breaker, which detects battery abnormality and cuts-off current, maintains a state of current cut-off until the manual reset mechanism is operated by pressing of the reset button.

2. A battery pack for electric power tools, as recited in claim 1, wherein the circuit breaker cuts-off current when the battery temperature is abnormal.

3. A battery pack for electric power tools, as recited in claim 1, wherein the circuit breaker cuts-off current when the battery current is abnormal.

4. A battery pack for electric power tools, as recited in claim 1, wherein the circuit breaker cuts-off current when either the battery temperature or current is abnormal.

5. A battery pack for electric power tools, as recited in claim 1, wherein the circuit breaker has a movable contact which stops in an on position or in an off position, and this movable contact is switched to the on position when the reset button is depressed.

6. A battery pack for electric power tools, as recited in claim 5, wherein the movable contact is an elastically deformable metal plate which stops in a stable on position and in a stable off position.

7. A battery pack for electric power tools, as recited in claim 1, wherein the reset button is connected to the case via a leaf spring in a manner that resiliently pushes the reset button outward.

8. A battery pack for electric power tools, as recited in claim 7, wherein the leaf spring pushes the movable contact to reset the circuit breaker when the reset button is pressed.

9. A battery pack for electric power tools, as recited in claim 1, wherein the circuit breaker is disposed in a fixed position within gaps created between the batteries.

10. A battery pack for electric power tools, as recited in claim 1, wherein an end of the circuit breaker has a threaded section, said threaded section passes through a base of the recessed region in the battery pack case, and the reset button is disposed inside the threaded region.

11. A battery pack for electric power tools, as recited in claim 1, wherein the circuit breaker has an attachment plate fixed to its end, this attachment plate is attached to a base of the recessed region of the battery pack case.

12. A battery pack for electric power tools, as recited in claim 1, wherein the reset button is disposed on a bottom surface of the battery pack case.

13. A battery pack for electric power tools, as recited in claim 1, wherein the reset button is disposed on a side-wall of the battery pack case.

14. A battery pack for electric power tools, as recited in claim 1, wherein the reset button is disposed in the recessed region of the battery pack case such that an exposed end of the button does not protrude from the recessed region of the battery pack case.

15. A battery pack for electric power tools, as recited in claim 1, wherein the reset button is enclosed by a rubber cover.

16. A battery pack for electric power tools, as recited in claim 1, wherein the battery pack case has an insertion section for insertion into an electric power tool, and the reset button is disposed protruding from a surface of this insertion section.

17. A battery pack for electric power tools, as recited in claim 1, wherein a seal is attached over an opening of the recessed region.

18. A battery pack for electric power tools, comprising:

a battery pack case having a recessed region in an outer surface thereof;

batteries mounted in said battery pack case;

a circuit breaker, including a manual reset mechanism, connected in series in circuit with said batteries, so as to cut off current flow in said circuit due to at least one of abnormal temperature and abnormal current until said manual reset mechanism is operated to reset said circuit breaker; and wherein said manual reset mechanism of said circuit breaker comprises a reset button disposed in said recessed region of said battery pack case.

19. A battery pack for electric power tools, comprising:

a battery pack case having a recessed region in an outer surface thereof;

batteries mounted in said battery pack case;

a circuit breaker, including a manual reset mechanism and a bimetal member, connected in series in circuit with said batteries, so as to cut off current flow in said circuit due to at least one of abnormal temperature and abnormal current until said manual reset mechanism is operated to reset said circuit breaker; and wherein said manual reset mechanism of said circuit breaker comprises a reset button disposed in said recessed region of said battery pack case.

* * * * *